United States Patent Office
2,719,159
Patented Sept. 27, 1955

2,719,159

PRODUCTION OF COMPOUNDS OF THE PYRIDINE SERIES

Walter Reppe, Heinrich Pasedach, and Matthias Seefelder, Ludwigshafen (Rhine), Germany, assignors to Badische Anilin- & Soda-Fabrik Aktiengesellschaft, Ludwigshafen (Rhine), Germany No Drawing. Application June 30, 1953,
Serial No. 365,274

Claims priority, application Germany July 3, 1952

5 Claims. (Cl. 260—290)

This invention relates to an improved process for the production of compounds of the pyridine series, especially of pure alkyl pyridines free from isomers and of halogenated pyridines.

We have found that compounds of the pyridine series are obtained in good yields by reacting glutaric dialdehydes or δ-ketoaldehydes as such or in the form of their acetals, in particular in the form of their cyclic enol acetals, i. e. the 2-alkoxy-2.3-dihydropyranes, or the corresponding 2-acyloxy-2.3-dihydropyranes, at elevated temperatures in the presence of oxidizing agents with aqueous solutions of ammonium salts.

The reaction proceeds, for example, according to the following schemes:

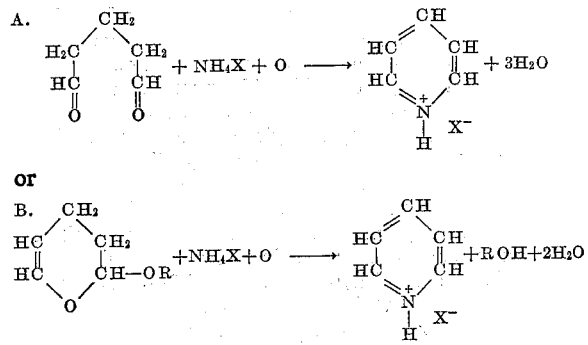

in which R represents an alkyl or acyl group and X the equivalent of a monovalent anion. For example ammonium sulfate or ammonium phosphate may be used.

The 2-alkoxy-2.3-dihydropyranes to be used as initial materials for the B modification of the process are known to be readily accessible by diene synthesis from vinyl ethers and α.β-unsaturated carbonyl compounds, for example 2-methoxy-2.3-dihydropyrane from acrolein and methyl vinyl ether, 2-ethoxy-4-methyl-2.3-dihydropyrane from crotonaldehyde and ethyl vinyl ether, 2-methoxy-5-methyl-2.3-dihydropyrane from α-methylacrolein and methyl vinyl ether, 2-ethoxy-4-ethyl-5-methyl-2.3-dihydropyrane from α-methyl-β-ethyl-acrolein and vinyl ethyl ether or 2-methoxy-6-methyl-2.3-dihydropyrane from vinyl methyl ketone and methyl vinyl ether. The 2-acyloxy-2.3-dihydropyranes are obtained in a corresponding manner from vinyl esters and α.β-unsaturated carbonyl compounds, as for example 2-acetoxy-2.3-dihydropyrane from vinyl acetate and acrolein. Other starting materials for such pyranes are α.β-dimethylacrolein and other α.β-dialkylacroleins wherein the alkyl group contains up to 5 carbon atoms.

These 2-alkoxy- or 2-acyloxy-2.3-dihydropyranes are known to be capable of ready saponification in acid medium to the free glutaric dialdehydes or α-ketoaldehydes, respectively, which serve as initial materials for the A modification of the process, or of conversion into their open chain acetals. Glutaric dialdehydes, δ-ketoaldehydes or their acetals which have been prepared in other ways, as for example by reduction of glutaric acid derivatives, can obviously also be used as initial materials.

Suitable oxidizing agents are in particular salts of metals of a higher stage of valency which are reducible to those of a lower stage of valency, as for example salts of trivalent iron or manganese, copper (II) salts, and also hydrogen peroxide in the presence of iron or copper salts. It is especially advantageous, for example, to use for the reaction ammonium ferric sulfate which acts at the same time as an ammonium salt and as an oxidizing agent.

We have further found that in addition to, or instead of, the halogen-free pyridine bases, the mono- or di-halogenated pyridine bases are obtained in the said process by using as the ammonium salts and/or as the oxidizing agents the corresponding halides, as for example ammonium chloride or bromide on the one hand and iron (III) chloride copper chloride or mercury (II) chloride on the other hand. It is also possible to work in the presence of free chlorine, bromine or iodine.

When free halogen is employed, it is advantageous to add this to the glutaric dialdehydes or the dihydropyrane derivatives at low temperature before the addition of the oxidizing agent and the ammonium salt. Moreover salts containing halogen ions can also be added. There can thus be obtained exclusively halogenated pyidine derivatives.

The separation of the mono- and di-halogenated pyridine bases from each other and from the non-halogenated pyridine compounds formed simultaneously is preferably effected by distillation of the reaction mixture at different pH values. At a pH of less than 4, generally speaking only the dihalogeno compounds distil over together with water, while the mono-halogenated pyridine compounds pass over at a pH value of about 4 to 6, and the halogen-free pyridine bases can be set free in neutral or weakly alkaline region and driven over.

By comparison of the physical constants with those of the known halogeno pyridines it can be shown that the halogeno compounds obtainable according to this invention are 3-halogeno or 3.5-dihalogeno pyridine compounds.

The process can be carried out by heating the reaction components with each other in aqueous solution, for example by bringing them to boiling under reflux. The procedure may, however, be also that the glutaric dialdehyde or the dihydropyrane derivative is allowed to flow into a heated, for example a boiling, solution of the ammonium salt and the oxidizing agent. The process may also be carried out under increased pressure and/or continuously.

The following examples will further illustrate this invention but the invention is not restricted to these examples; the parts are parts by weight.

Example 1

An aqueous-acid solution of 114 parts of β-methyl-glutaric dialdehyde (obtained by hydrolysis of 128 parts of 2-methoxy-4-methyl-2.3-dihydropyrane with 500 parts of 2% sulfuric acid) is allowed to flow gradually into a boiling solution of 964 parts of crystallized ammonium ferric sulfate in 1000 parts of water. After distilling off the methanol, the reaction mixture is made alkaline and the γ-picoline formed is then distilled off. The yield amounts to 85 parts, equivalent to 91% of the theoretical yield.

If the solution of ammonium ferric sulfate be added to the solution of the β-methylglutaric dialdehyde at room temperature and the mixture then heated for 2 hours under reflux, there are obtained, by working up in the manner described above, only 62 parts of γ-picoline.

Example 2

A solution of 200 parts of glutaric dialdehyde in 800 parts of 3% sulfuric acid is allowed to flow during the course of 2 hours into a boiling solution of 1100 parts of crystallized ferric sulfate and 200 parts of ammonium sulfate in 1500 parts of water. By working up as in Example 1 pure pyridine is obtained in a yield which is 82% of the theoretical yield.

Example 3

142 parts of 2-ethoxy-5-methyl-2.3-dihydropyrane (prepared from α-methacrolein and vinyl ethyl ether by diene synthesis) are introduced during the course of 2 hours into a boiling solution of 132 parts of ammonium sulfate and 500 parts of crystallized cupric sulfate in 1000 parts of 1% sulfuric acid. By working up as described in the foregoing examples, 45 parts of pure β-picoline are obtained.

Example 4

260 parts of 2-methoxy-4-methyl-2.3-dihydropyrane are added during the course of about 2 to 3 hours to a boiling solution of 990 parts of ferric chloride and 200 parts of ammonium chloride in 6000 parts of water, and the solution is then heated under reflux for about another 30 minutes. After adding about 250 parts of an about 50% caustic soda solution, about 4.5 parts of dichloropicoline, together with water containing methanol, are distilled off at a pH-value of 2 to 3. The solid compound is obtained by separating the water. It melts at 49° C. and is probably 3.5-dichloro-4-methylpyridine. By adding a further 550 parts of about 50% caustic soda solution, the monochloropicoline is distilled over with steam at a pH-value of 4 to 6. From the distillate there can be obtained, by generally known methods, 55 parts of a substance boiling at 178° C. which is probably 3-chloro-4-methylpyridine.

Finally, after adding further alkali, the halogen-free 4-methylpyridine is driven over with steam at a pH-value of 6 to 9. There are obtained 67 parts of pure 4-methylpyridine.

Example 5

A solution of 228 parts of β-methylglutaric dialdehyde in 200 parts of 3% hydrochloric acid is allowed to flow during the course of 2 to 3 hours into a boiling solution of 990 parts of ferric chloride and 200 parts of ammonium chloride in 6000 parts of water. The reaction mixture is worked up as described in the foregoing examples. 4.5 parts of dichloro-piccoline, 43 parts of monochloropicoline and 99 parts of γ-picoline are obtained.

Example 6

230 parts of 2-methoxy-2.3-dihydropyrane are reacted, as in Example 4, with a boiling solution of 990 parts of ferric chloride and 200 parts of ammonium chloride in 6000 parts of water, and the pyridine compounds are distilled off together with water after adding alkali in stages as described in Example 4.

7 parts of dichloropyridine are obtained. It has the melting point 66° to 67° C. The melting point of its mercury chloride double salt is 183° C., which indicates 3.5-dichloropyridine. 38 parts of monochloropyridine (boiling point 148° C.) and 90 parts of pyridine are also obtained.

Example 7

260 parts of 2-methoxy-4-methyl-2.3-dihydropyrane are treated at temperatures between 0° and 5° C. while stirring with 142 parts of chlorine. The reaction product is immediately allowed to flow during the course of 3 hours into a boiling solution of 660 parts of ferric chloride and 200 parts of ammonium chloride in 4000 parts of water, and the mixture is kept boiling for a further half hour.

After adding 400 parts of about 50% caustic soda solution, the dichloro-γ-picoline formed is distilled off together with methanol and water. The solid product is separated from the liquid phase; 10 parts of 3.5-dichloro-γ-picoline with a melting point of 49° C. are obtained. As soon as the dichloropicoline has ceased to pass over, another 350 parts of about 50% caustic soda solution are added to the distilling flask, so that the monochloropicoline passes over together with water. From the distillate, by working up the liquid phase, there are obtained 136 parts of monochloro-γ-picoline which, after drying with caustic potash, boils at 178° C. It is 3-chloro-4-methylpyridine.

Example 8

460 parts of 2-methoxy-2.3-dihydropyrane are saturated with 284 parts of chlorine at 0° to 5° C. and the reaction product is immediately allowed to flow during the course of 5 hours into a boiling solution of 2200 parts of ferric sulfate and 400 parts of ammonium sulfate in 4000 parts of water. The mixture is then stirred for another half an hour. By distilling off water and alcohol, 15 parts of 3.5-dichloropyridine pass over therewith and can be recovered by separation from the aqueous phase. After adding an aqueous about 50% alkali solution to the product remaining in the distillation flask until it has a neutral reaction, 215 parts of chloropyridine can be recovered from the distillate upon further distillation.

Example 9

372 parts of the chlorination product of 2-methoxy-2,3-dihydropyrane (obtained as described in Example 8) are allowed to flow into a boiling solution prepared from 660 parts of ferric chloride, 200 parts of ammonium chloride and 4000 parts of water. The mixture, when worked up as in Example 8, yields 7 parts of 3.5-dichloropyridine and 104 parts of 3-chloropyridine.

What we claim is:

1. An improved process for the production of compounds of the pyridine series which comprises boiling a member of the group consisting of glutaric dialdehyde, alkyl glutaric dialdehydes, 2-alkoxy-2,3-dihydropyranes and chlorine-saturated 2-alkoxy-2,3-dihydropyranes with aqueous solutions of at least stoichiometric amounts of ammonium salts and at least stoichiometric amounts of oxidizing agents selected from the group consisting of water-soluble ferric and cupric salts.

2. A process for the production of gamma-picoline which comprises introducing β-methyl glutaric dialdehyde gradually into a boiling aqueous solution of at least stoichiometric amounts of ammonium ferric sulfate.

3. A process for the production of beta-picoline which comprises introducing 2-ethoxy-2,3-dihydropyrane gradually into a boiling aqueous solution of at least stoichiometric amounts of ammonium and cupric sulfates.

4. A process for the production of a mixture of pyridine and its mono- and dichloro-derivatives which comprises introducing 2-alkoxy-2,3-dihydropyranes gradually into a boiling aqueous solution of at least stoichiometric amounts of ammonium and ferric chlorides.

5. A process for the production of mono- and dichloropyridines which comprises introducing a chlorine saturated 2-alkoxy-2,3-dihydropyrane into a boiling aqueous solution of at least stoichiometric amounts of ammonium and ferric chlorides.

References Cited in the file of this patent

UNITED STATES PATENTS

| | | |
|---|---|---|
| 2,528,978 | Smith et al. | Nov. 7, 1950 |
| 2,546,018 | Smith et al. | Mar. 20, 1951 |